(No Model.)
F. A. C. WUNDERLICH & D. N. GLEASON.
TURNING LATHE.
No. 512,427. Patented Jan. 9, 1894.
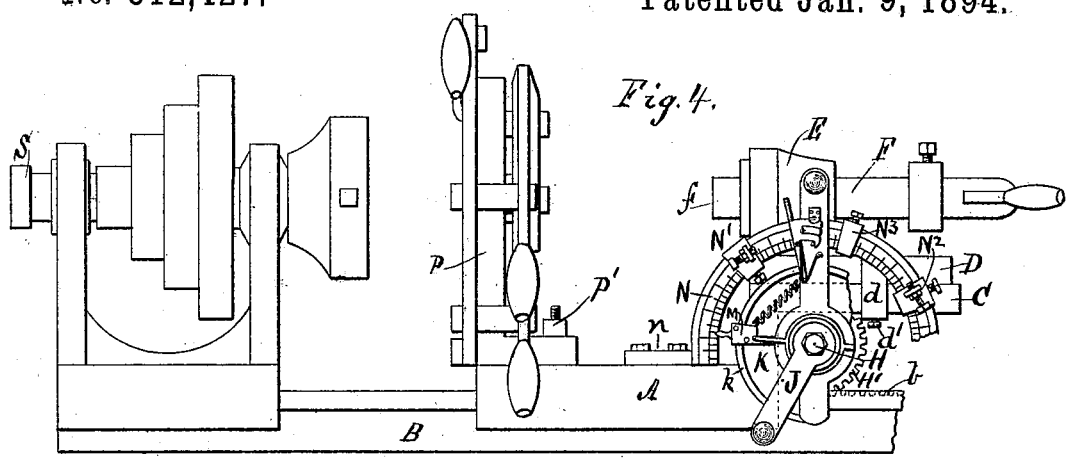
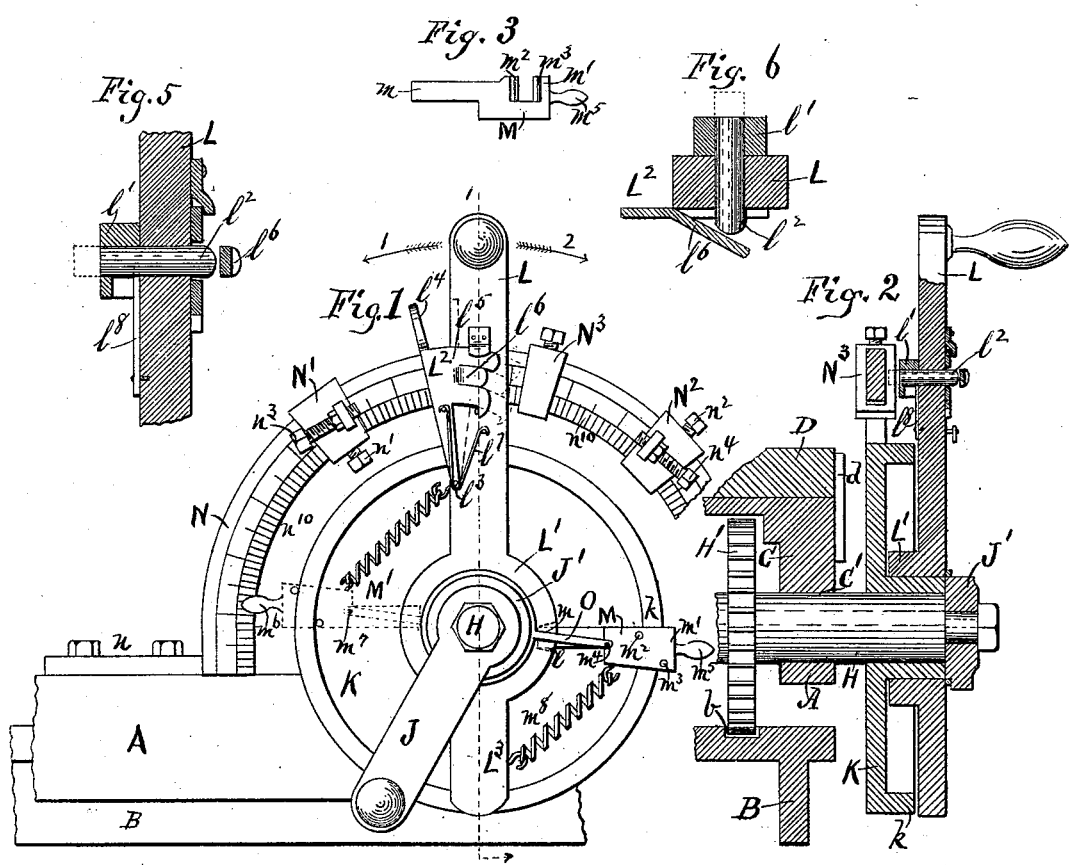
WITNESSES:
G. Waldo
G. F. Thomas
INVENTORS
Frederick A. C. Wunderlich
Duane N. Gleason
BY
George C. Thomas
ATTORNEY

UNITED STATES PATENT OFFICE.

FREDERICK A. C. WUNDERLICH, OF NEW YORK, AND DUANE N. GLEASON, OF BROOKLYN, NEW YORK.

TURNING-LATHE.

SPECIFICATION forming part of Letters Patent No. 512,427, dated January 9, 1894.

Application filed January 20, 1892. Serial No. 418,656. (No model.)

*To all whom it may concern:*

Be it known that we, FREDERICK A. C. WUNDERLICH, residing at New York, in the county of New York, and DUANE N. GLEASON, residing at Brooklyn, in the county of Kings, State of New York, citizens of the United States, have invented certain new and useful Improvements in Turning-Lathes, of which the following is a specification.

Our invention relates to improvements in turning lathes in which the tail stock is provided with mechanism for performing a number of consecutive operations.

The objects of our improvements are to provide means for a rapid and accurate adjustment of the tools to position, thus enabling the operations to be more quickly performed and a saving in material made.

These improvements are particularly applicable to the turning lathe patented by Ernest Lindner January 31, 1888, No. 377,080.

Figure 1 is a front view of the adjusting wheel and appurtenances; Fig. 2, a section on line 1. 2. Fig. 1; Fig. 3 a top view of clutch arm; Fig. 4, a front elevation showing the improvement applied to a lathe; Fig. 5. an enlarged vertical section of crank arm and details; Fig. 6 an enlarged horizontal section of same; Fig. 7. a view partly in section of crank and clutch arm.

Similar letters refer to similar parts in all views.

The tail stock A rests upon the lathe bed B upon which it moves as is customary in lathes of this class. A part C of the tail stock is raised above the bed B for the purpose of supporting a part D which is adjustable longitudinally upon C. This part D may be secured rigidly to A by means of a sleeve $d$ attached permanently to D and a set screw $d'$ working in $d$ against C. The part D carries a head E and spindle F to which spindle a tool chuck may be attached at $f$ in the customary manner. A shaft H is journaled upon the tail stock at C'. A pinion H' upon the shaft H takes into a rack $b$ upon the lathe bed. By revolving the shaft H the tail stock is moved longitudinally upon the lathe bed. A crank J serves to turn the shaft H. A flanged disk K is keyed upon the shaft H which it turns by means of the crank L and a clutch arm M. The movement of the crank L is limited by stops $N'$ $N^2$ $N^3$ adjusted upon the curved arm N which is bolted to the tail stock at $n$. The curved arm N may be divided into spaces $n^{10}$, by any scale, for use in setting the stops. The stops $N'$ $N^2$ may consist of sleeves upon the bent arm N held in position by set screws $n'$ $n^2$. Set screws $n^3$ $n^4$ may be attached to the stops to facilitate close adjustment.

The clutch arm M rests at one end $m$ in a recess $l$ in the hub L' of the crank L. The opposite end $m'$ projects beyond the flange $k$ of the disk K and has two pins $m^2$ $m^3$ one on each side of the flange. A spring $m^8$ extending from an arm $L^2$, attached to hub L', to the clutch arm M constantly pulls M so that both pins $m^2$ $m^3$ bear against the flange $k$.

The crank L has a pin $l'$ projecting from one side which may be brought into contact with the stops $N'$ $N^2$. A pin $l^2$ slides longitudinally through pin $l'$ to be brought against the stop $N^3$. See Figs. 5 and 6. This sliding pin $l^2$ is operated by a lever $L^3$ fulcrumed at $l^3$ having a thumb piece $l^4$ and a flange $l^5$. The flange $l^5$ is provided with a beveled part $l^6$ which causes the pin $l^2$ to project beyond the end of pin $l'$ when the lever $L^3$ is caused to take the position shown by the dotted lines. A spring $l^7$ restores the lever $L^3$ to the position shown in full lines and a spring $l^8$ returns pin $l^2$ when liberated by the lever $L^2$.

The clutch arm M may be duplicated at the opposite side of the flanged disk K as shown by dotted lines at M'. By this means the strain may be equally divided between the opposite sides of the flange $k$, permitting the use of lighter parts.

A lever O journaled on the hub J' and extending from a pin $m^4$ on arm M to a pin $m^7$ similarly situated on arm M' causes the two arms M and M' to move correspondingly so that either arm M or M' being operated by the hand piece $m^5$ or $m^6$ the opposite arm will be similarly operated.

An upright P is adjustably attached to the tail stock A. It can be fitted so as to move longitudinally upon A and be firmly attached in any desired position by a screw and nut as shown at P' or by any other well known means. This upright sustains and steadies the rod to be operated upon and may also have tools attached thereto as is now well known in the art. A hollow spindle S is mounted on B in the customary manner.

The crank J can be used to move the tail stock in either direction on the lathe bed, as is now common in lathes. The tail stock A is moved toward the left by the crank L to any desired position determined by stops $N'$ $N^2$ $N^3$ as secured to the curved arm N. This is effected by means of the clutch arm M which operates as follows: The end of arm M rests in a recess $l$ in the hub $L'$. See Fig. 7. The end $m'$ is drawn by spring $m^8$ toward arm $L^3$ until the pins $m^2$ $m^3$ both rest against flange $k$ causing M and $k$ to be immovably united by any force applied in an upward direction at the end $m$. If now lever L is moved to the left, that is in direction of arrow 1, the hub $L'$ turns, carrying with it arm M and flange $k$ which through the disk K transmits motion to shaft H, pinion $H'$ and tail stock A. This motion is arrested at any point desired by means of the pins $l'$ $l^2$ on lever L coming in contact with stops on arm N.

The crank L operates in conjunction with the stops on arm N as follows: Tail stock A is moved by crank J to any point desired. The material to be operated upon is introduced through the hollow spindle S and upright P in the same manner as in lathes heretofore in use. A tool chuck with the number of tools desired is attached to spindle F at $f$. The lever L occupies a position with pin $l'$ against stop $N^2$. Assuming that the first operation it is desired to make requires the tail stock to occupy a position that is determined by the pin $l^2$ coming in contact with stop $N^3$, lever $L^2$ is pressed by the thumb and caused to take the position shown by broken lines Fig. 1, pin $l^2$ is caused to project beyond the end of pin $l'$ as indicated by broken lines, and crank L is now moved to the left until stopped by $N^3$. The desired tool is caused to operate by the usual means. The tail stock can now be caused to move forward another step for a new operation by releasing lever $L^2$ thus allowing pin $l^2$ to be withdrawn by the spring, as before explained, to a position determined by stop $N'$ against which pin $l'$ strikes. It is obvious that any number of stops can be arranged on arm N to be used successively.

What we claim is—

1. In a turning lathe, the combination with a crank and crank shaft mounted on a tail stock, of a pinion on said shaft working in a fixed rack on the lathe bed, a plurality of clutches for connecting said crank and crank shaft, and a connection extending from one to another of said clutches whereby the two are caused to move correspondingly, substantially as specified.

2. In a turning lathe, the combination with a tail stock, of a crank and crank shaft, a clutch for connecting said crank and crank shaft, a graduated arm, adjustable stops on said arm, and means coacting with said stops to limit the movement of the crank shaft, substantially as specified.

3. In a turning lathe the combination with a tail stock of a crank a clutch and an arm with adjustable stops substantially as specified.

4. In a turning lathe the combination with a tail stock of a crank having spring pin, a clutch and an arm with adjustable stops substantially as specified.

5. In a turning lathe the combination with a tail stock of a crank operating a clutch, an adjustable stop on said crank and adjustable stops attached to the tail stock, substantially as specified.

6. In a turning lathe, the combination with a lathe bed, of a tail stock mounted thereon, a curved arm carried by the tail stock, a lever for adjusting said tail stock, adjustable stops on said arm, a pin carried by said lever adapted to coact with the stops on the arm, and a lever carried by the first named lever for operating said pin in one direction.

Signed at New York, in the county of New York and State of New York, this 19th day of January, A. D. 1892.

FREDERICK A. C. WUNDERLICH.
DUANE N. GLEASON.

Witnesses:
EMIL F. GENNEET,
JAMES B. DEMOTT.